United States Patent
Starner et al.

(10) Patent No.: US 9,684,374 B2
(45) Date of Patent: Jun. 20, 2017

(54) EYE REFLECTION IMAGE ANALYSIS

(71) Applicant: Google Inc., Mountain View, CA (US)

(72) Inventors: Thad Eugene Starner, Mountain View, CA (US); Hayes Solos Raffle, Palo Alto, CA (US); Yong Zhao, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/627,790

(22) Filed: Feb. 20, 2015

(65) Prior Publication Data

US 2015/0160461 A1 Jun. 11, 2015

Related U.S. Application Data

(63) Continuation of application No. 13/568,095, filed on Aug. 6, 2012, now abandoned.
(Continued)

(51) Int. Cl.
*G06K 9/00* (2006.01)
*G06F 3/01* (2006.01)
(Continued)

(52) U.S. Cl.
CPC ......... *G06F 3/013* (2013.01); *G02B 27/017* (2013.01); *G02B 27/0093* (2013.01); *G02B 2027/014* (2013.01); *G02B 2027/0138* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS 3,986,030 A    10/1976   Teltscher
4,595,990 A    6/1986   Garwin et al.
(Continued)

FOREIGN PATENT DOCUMENTS

| WO | 01/06298 | 1/2001 |
|---|---|---|
| WO | 2011/114092 | 9/2011 |
| WO | 2013/019701 | 2/2013 |

OTHER PUBLICATIONS

Nishino, Ko, and Shree K. Nayar. "Corneal imaging system: Environment from eyes." International Journal of Computer Vision 70.1 (2006): 23-40.*

(Continued)

*Primary Examiner* — Sumati Lefkowitz
*Assistant Examiner* — David Perlman
(74) *Attorney, Agent, or Firm* — McDonnell Boehnen Hulbert & Berghoff LLP

(57) ABSTRACT

Example methods and devices are disclosed for generating life-logs with point-of-view images. An example method may involve: receiving image-related data based on electromagnetic radiation reflected from a human eye, generating an eye reflection image based on the image-related data, generating a point-of-view image by filtering the eye reflection image, and storing the point-of-view image. The electromagnetic radiation reflected from a human eye can be captured using one or more video or still cameras associated with a suitably-configured computing device, such as a wearable computing device.

15 Claims, 9 Drawing Sheets

Related U.S. Application Data

(60) Provisional application No. 61/584,147, filed on Jan. 6, 2012.

(51) Int. Cl.
*G02B 27/00* (2006.01)
*G02B 27/01* (2006.01)

(56) References Cited

U.S. PATENT DOCUMENTS

| | | | |
|---|---|---|---|
| 4,720,189 A | 1/1988 | Heynen et al. | |
| 4,836,670 A | 6/1989 | Hutchinson | |
| 4,973,149 A | 11/1990 | Hutchinson | |
| 5,360,971 A | 11/1994 | Kaufman et al. | |
| 5,430,505 A | 7/1995 | Katz | |
| 5,689,619 A | 11/1997 | Smyth | |
| 5,905,563 A | 5/1999 | Yamamoto | |
| 6,037,936 A | 3/2000 | Ellenby et al. | |
| 6,082,858 A | 7/2000 | Grace et al. | |
| 6,120,461 A | 9/2000 | Smyth | |
| 6,198,462 B1 | 3/2001 | Daily et al. | |
| 6,426,740 B1 | 7/2002 | Goto et al. | |
| 6,456,262 B1 | 9/2002 | Bell | |
| 6,577,329 B1 | 6/2003 | Flickner et al. | |
| 6,667,694 B2 | 12/2003 | Ben-ari et al. | |
| 6,847,336 B1 | 1/2005 | Lemelson et al. | |
| 7,091,928 B2 | 8/2006 | Rajasingham | |
| 7,113,151 B2 | 9/2006 | Kinebuchi | |
| 7,192,136 B2 | 3/2007 | Howell et al. | |
| 7,255,437 B2 | 8/2007 | Howell et al. | |
| 7,347,551 B2 | 3/2008 | Fergason et al. | |
| 7,380,936 B2 | 6/2008 | Howell et al. | |
| 7,401,918 B2 | 7/2008 | Howell et al. | |
| 7,438,410 B1 | 10/2008 | Howell et al. | |
| 7,481,531 B2 | 1/2009 | Howell et al. | |
| 7,500,746 B1 | 3/2009 | Howell et al. | |
| 7,500,747 B2 | 3/2009 | Howell et al. | |
| 7,543,934 B2 | 6/2009 | Howell et al. | |
| 7,581,833 B2 | 9/2009 | Howell et al. | |
| 7,621,634 B2 | 11/2009 | Howell et al. | |
| 7,677,723 B2 | 3/2010 | Howell et al. | |
| 7,760,898 B2 | 7/2010 | Howell et al. | |
| 7,771,046 B2 | 8/2010 | Howell et al. | |
| 7,792,552 B2 | 9/2010 | Thomas et al. | |
| 7,806,525 B2 | 10/2010 | Howell et al. | |
| 7,922,321 B2 | 4/2011 | Howell et al. | |
| 8,073,198 B2 | 12/2011 | Marti | |
| 8,109,629 B2 | 2/2012 | Howell et al. | |
| 8,368,794 B2 | 2/2013 | Sako | |
| 8,430,310 B1 | 4/2013 | Ho et al. | |
| 9,064,016 B2 * | 6/2015 | Shokouhi | G06F 17/30867 |
| 2002/0024633 A1 | 2/2002 | Kim et al. | |
| 2003/0020707 A1 | 1/2003 | Kangas et al. | |
| 2003/0161097 A1 | 8/2003 | Le et al. | |
| 2006/0061544 A1 | 3/2006 | Min | |
| 2006/0109242 A1 | 5/2006 | Simpkins | |
| 2006/0115130 A1 | 6/2006 | Kozlay | |
| 2006/0224238 A1* | 10/2006 | Azar | G02C 7/101 623/6.22 |
| 2006/0256083 A1 | 11/2006 | Rosenberg | |
| 2007/0024579 A1 | 2/2007 | Rosenberg | |
| 2007/0052672 A1 | 3/2007 | Ritter | |
| 2007/0131759 A1 | 6/2007 | Cox et al. | |
| 2007/0164990 A1 | 7/2007 | Bjorklund et al. | |
| 2007/0201731 A1* | 8/2007 | Fedorovskaya | G06F 17/30265 382/118 |
| 2008/0055194 A1 | 3/2008 | Baudino et al. | |
| 2009/0024964 A1* | 1/2009 | Kantamneni | G06Q 30/02 715/854 |
| 2009/0282025 A1* | 11/2009 | Winter | G06F 17/30256 |
| 2010/0295706 A1 | 11/2010 | Mathan | |
| 2010/0295769 A1 | 11/2010 | Lundstrom | |
| 2010/0332841 A1 | 12/2010 | Watts et al. | |
| 2011/0150282 A1* | 6/2011 | Gupta | G06K 9/00771 382/103 |
| 2011/0175932 A1 | 7/2011 | Yu | |
| 2011/0213664 A1 | 9/2011 | Osterhout | |
| 2011/0219427 A1 | 9/2011 | Hito et al. | |
| 2011/0295502 A1 | 12/2011 | Faenger | |
| 2012/0019645 A1 | 1/2012 | Maltz | |
| 2012/0019662 A1 | 1/2012 | Maltz | |
| 2012/0109923 A1* | 5/2012 | Pasquero | G06F 17/30864 707/706 |
| 2012/0290401 A1* | 11/2012 | Neven | A61B 3/113 705/14.68 |
| 2012/0300998 A1 | 11/2012 | Ioudovski et al. | |
| 2013/0011024 A1 | 1/2013 | Heckman | |
| 2013/0050432 A1* | 2/2013 | Perez | H04N 13/0278 348/47 |
| 2013/0069787 A1 | 3/2013 | Petrou | |
| 2014/0337634 A1 | 11/2014 | Starner et al. | |

OTHER PUBLICATIONS

O'Brien; T., "Eye-tracking microdisplay delivers Terminator vision, distracts joggers", Apr. 20, 2011, AOL Inc.
Van Tonder, "The Development and Evaluation of Gaze Selection Techniques", Apr. 2009, PhD. Dissertation, Nelson Mandela Metropolitan University.
Wartenberg; P., "Eyecatcher: The Bi-Directional OLED Microdisplay", May 17, 2011, Fraunhofer IPMS.
Nishimo; K., "Chapter 7: Exraction of Visual Information from Images of Eyes", Passive Eye Monitoring: Algorithms, Applications and Experiments, 2008, 153-177, Springer.
Nishino et al., "Corneal Imaging Systems: Environment from Eyes", International Journal of Computer Vision, 2006, 70(1), 23-40.
International Search Report and Written Opinion of International Application No. PCT/US2014/017117 dated Jun. 23, 2014 (mailed Jul. 1, 2014), 10 pages.

* cited by examiner

EYE REFLECTION IMAGE ANALYSIS

CROSS-REFERENCE TO RELATED APPLICATIONS

This application is a continuation of U.S. patent application Ser. No. 13/568,095, entitled "Eye Reflection Image Analysis," filed on Aug. 6, 2012 which claims priority to U.S. Provisional Patent App. No. 61/584,147, entitled "Life-Log Based on Retinal Image Analysis", filed Jan. 6, 2012, the contents of which are fully incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mountable displays" (HMDs). A head-mountable display is configured to place a graphic display or displays close to one or both eyes of a wearer. To generate the images on a display, a computer processing system may be used. Such displays may occupy a wearer's entire field of view, or only occupy part of wearer's field of view. Further, head-mountable displays may be as small as a pair of glasses or as large as a helmet.

Emerging and anticipated uses of wearable displays include applications in which users interact in real time with an augmented or virtual reality and may include recording these interactions. Such applications can be mission-critical or safety-critical, such as in a public safety or aviation setting. The applications can also be recreational, such as interactive gaming.

SUMMARY

In one aspect, an example computer-implemented method can involve: (a) detecting electromagnetic radiation reflected from a human eye, (b) receiving image-related data based on the detected electromagnetic radiation at a computing device, (c) generating an eye reflection image based on the image-related data using the computing device, (d) generating a point-of-view image by filtering the eye reflection image using the computing device, and (e) storing the point-of-view image on the computing device.

In a second aspect, an example computing device is provided. The computing device can include a processor, a non-transitory computer-readable medium, and program instructions stored in the non-transitory computer-readable medium. The program instructions can be executable by the processor to cause the computing device to perform functions. The functions can include: (a) receiving image-related data based on electromagnetic radiation reflected from a human eye, (b) generating an eye reflection image based on the image-related data, (c) generating a point-of-view image by filtering the eye reflection image, and (d) storing the point-of-view image.

In another aspect, an example article of manufacture can include a non-transitory computer-readable medium with instructions stored on the non-transitory computer-readable medium. If the instructions are executed by a computing device, the instructions can cause the computing device to perform functions. The functions can include: (a) receiving image-related data based on electromagnetic radiation reflected from a human eye at a computing device, (b) generating an eye reflection image based on the image-related data, (c) generating a point-of-view image by filtering the eye reflection image, and (d) storing the point-of-view image.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. The example embodiments described herein are not meant to be limiting. It will be readily understood that certain aspects of the disclosed systems and methods can be arranged and combined in a wide variety of different configurations, all of which are contemplated herein.

Example systems and methods may be implemented in the context of a wearable computer with a head-mountable display and a touch-based interface (e.g., a touchscreen or touchpad).

I. Example Methods

Figure 1:
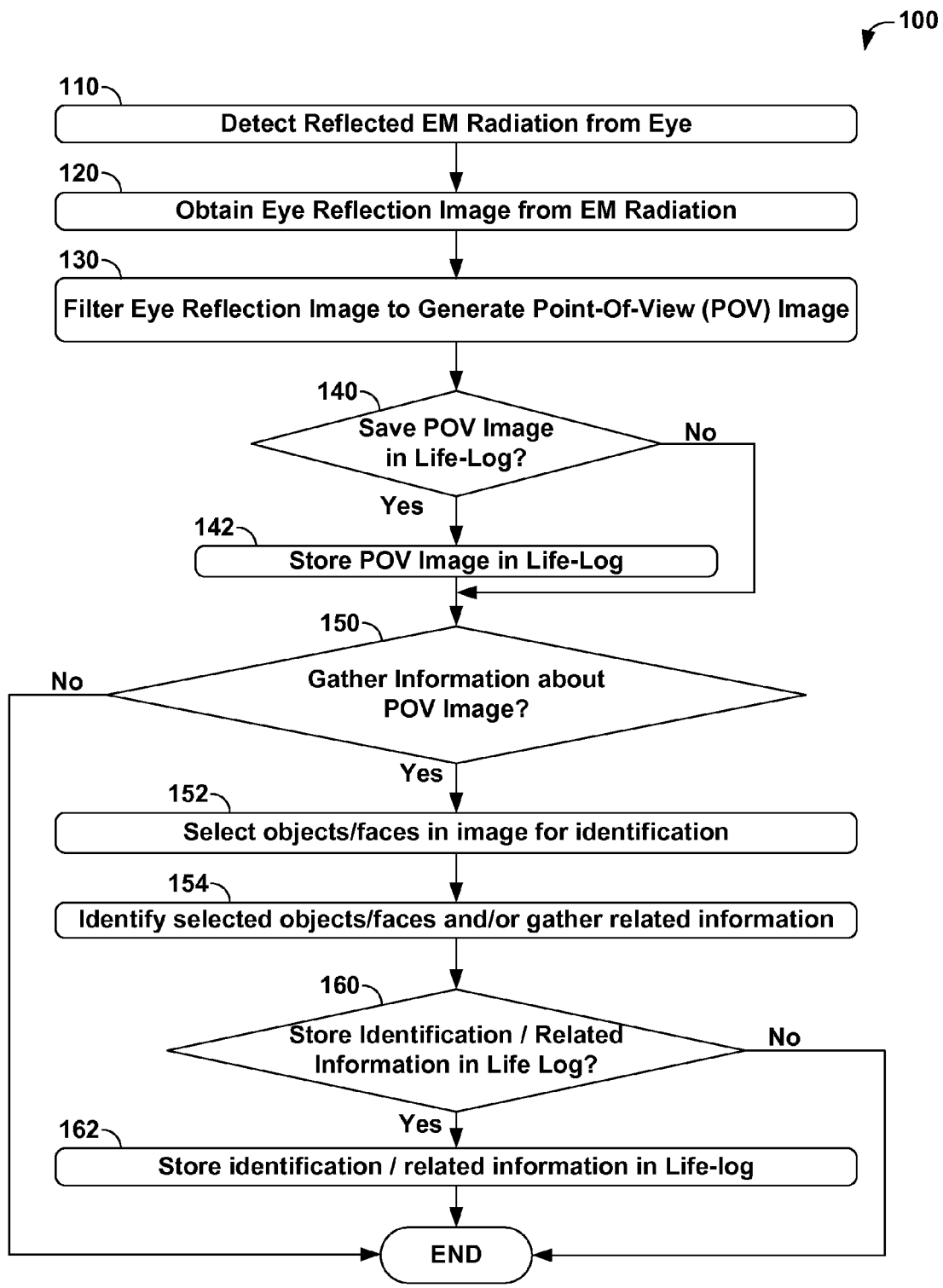
FIG. 1 is a flow chart illustrating a method, according to an example embodiment.

FIG. 1 is a flow chart illustrating method 100, according to an example embodiment. Method 100 is described by way of example as being carried out by a wearable computer, but may be carried out by other devices or systems as well.

Method 100 may be implemented to generate and store images and related information into a "life-log". The life-log can be a record of events that occurred while accessing the computing device. The record of an event in the life-log can include audio, video, still images, alphanumeric information, and/or other data.

For example, suppose a wearer W of a wearable computing device meets a person P for the first time. Upon meeting P, W can instruct the wearable computing device to create a life-log entry with identification information, such as a name for P, and perhaps a still image of P. The still image can be a "point-of-view" (POV) image, which is an image taken using an "inward-facing" camera aboard the wearable computing device. An inward-facing camera is configured to be aimed at an eye of a wearer and to capture electromagnetic (EM) radiation (a.k.a. light) reflected from the eye of the wearer. In contrast, an "outward-facing camera" aboard the wearable computing device is configured to be aimed away from the eye of the wearer and to capture electromagnetic radiation from an environment that reaches the wearable computing device. Generating the point-of-view image can involve filtering an image to remove artifacts related to the eye and/or to increase image quality from the reflected light. Multiple point-of-view images, such as one image/eye, can be captured at the same time.

Once captured, the point-of-view image can be stored and/or used as a trigger to obtain additional data for the life-log. For example, suppose that the wearable computing device has at least two cameras associated with an eye: an inward-facing camera configured to capture electromagnetic radiation reflected from the eye, and an outward-facing camera configured to capture electromagnetic radiation before it reaches the eye. Then, upon capturing the point-of-view image using the inward-facing camera, the point-of-view image and/or a corresponding image generated by the outward-facing camera can be stored in the life-log. Also or instead, additional data, such as but not limited to comments on the point-of-view image, search results based on the point-of-view image, and/or other data can be added to the life-log, perhaps with an indication that the additional data is associated with the point-of-view image.

At block 110, reflected electromagnetic radiation from an eye is detected. At block 120, an "eye reflection image" or image of the eye based on the detected electromagnetic radiation is obtained. In some embodiments, the eye reflection image can include an image of taken from a cornea of the eye. For example, the eye reflection image can be an image reflected off of a first surface of a portion of the cornea that is over a pupil of the eye. In other embodiments, the eye reflection image can include an image of the pupil and/or other eye features such as the sclera, retina, blood vessels, or other eye features to approximate the eye's point of view on the scene. In particular embodiments, the eye reflection image can be a combination of an eye tracker image plus an image of spectral reflection from the iris of the eye.

The eye reflection image can include an image of the eye that reflected the electromagnetic radiation, as well as any objects in the field-of-view of the eye. In some cases, the eye reflection image can provide a "panoramic" or wide-angle view; while in other cases, the eye reflection image can be cropped to provide a narrower-angle view. For example, a panoramic view can have a field-of-view of approximately 170 degrees, while an example narrower-angle view can be cropped to a predetermined field-of-view with respect to a cornea, pupil, or gaze direction of an eye; e.g., within 45 degrees, 60 degrees, or some other value.

At block 130, the eye reflection image can be filtered to generate a point-of-view image. For example, if the eye reflection image includes an image of part or all of an iris, pupil, lid, lashes, etc. of the human eye, the eye reflection image can be filtered to remove the various artifacts related to the human eye to generate the point-of-view image.

A technique to perform this filtering involves taking a difference of the eye reflection image and a "reference image." An example of a reference image is an image of electromagnetic radiation reflected from the human eye without any objects in the field-of-view, perhaps adjusted for gaze direction, rotations/translations between images, and for any cropping performed to generate the eye reflection image. The difference between the point-of-view image and the reference image can result in an image of any objects in the field-of-view of the eye without the artifacts related to the eye.

Other filtering techniques can be utilized to improve the point-of-view image as well. For example, if images from both eyes are captured simultaneously or nearly simultaneously, super-resolution and/or other techniques can be used to improve image quality in the point-of-view image. Super-resolution can also be used to improve image quality when several similar images are captured over time; e.g., a group of point-of-view images captured while the eye is in a relatively fixed position (a.k.a. staring).

At block 140, a decision can be made to save the point-of-view image in the life-log. This decision can be made based on a command or other indication requesting that the point-of-view image be saved, a biometric indication, a change over time in point-of-view images, and/or a lack of change over time in point-of-view images.

The command or other indication can involve a specific user command/input via touch screen, keypad, keyboard, a voice command, a visual command, or other type of input. A visual command can involve directing a gaze at a command region of a head-mountable display for at least a pre-determined period of time, which triggers an action by the head-mountable display. For example, a small region of the head-mountable display can display the words "Save POV Image?", and if a wearer of the head-mountable display gazes at this display for at least the pre-determined period of time, then the head-mountable display can save the point-of-view image.

The biometric indication can involve a change in pulse rate, heart rate, blink rate, breathing rate, blood pressure, galvanic skin response, breathing volume, movement, and/or change(s) in other biometric values. Also, the biometric indication can involve a biometric value being greater (or less) than a pre-determined value for a period of time; e.g., a biometric indication that a breathing rate has been less than ten breaths/minute for at least one minute or a pulse rate has exceed 180 beats/second for at least 30 seconds. Other biometric indications are possible as well.

In some embodiments, each time the point-of-view image changes, then the point-of-view image can be stored in the life-log. In some cases, the images can be saved as video images, perhaps with accompanying sound. In other cases, the images can be saved as still images, perhaps again with accompanying sound. In even other cases, the point-of-view image may have to change more than a threshold amount to be treated as a changed image; e.g., more than a five degree change in a rotation of the image, more than a pre-determined number or percentage of pixels between two images have to change, etc.

In even other embodiments, the point-of-view image can be saved periodically, either as a still image or as part of a video image.

In other scenarios, if the point-of-view image does not change for at least a pre-determined period of time, then the point-of-view image can be saved. In these scenarios, perhaps a wearer of the head-mountable display is staring at an important object, and so the point-of-view image of the important object can be saved in the life-log once a duration of staring exceeds a threshold amount of time. As discussed above, the point-of-view image may have to change less than a threshold amount to be treated as an unchanged image to permit slight variations between images to be considered as the same image.

In some embodiments, an image and/or other information related to the point-of-view image can be stored with or instead of the point-of-view image. For example, suppose the point-of-view image includes a sub-image of a stared-at object, and that the head-mountable display is configured with at least one outward-facing camera. Then, in some cases, an image from the outward-facing camera can also include a sub-image of the stared-at object and can be of better quality than the point-of-view image. Upon determining that the outward-facing-camera image includes the stared-at object and is of better quality than the point-of-view image, the outward-facing-camera image can be stored instead of or in addition to the point-of-view image.

As another example, suppose an image search is performed. The image search can involve finding one or more images that are the same or similar to an input image, and in some cases, data related to the found one or more images. In this example, the input image to the image search can be a sub-image of the point-of-view image that includes the stared-at object. In response to the image search, found image-search data related to the stared-at object can be provided to the head-mountable display. The found image-search data can include additional images of the stared-at objects, identification information, advertising-related information, related articles/information about the stared-at object, and additional information. As a specific example, suppose the stared-at object is a can of pop (a.k.a. soda). If an image search is performed using a sub-image of the can of pop, the can and/or the pop can be identified, a manufacturer of the can and/or pop can be identified, ads for the pop can be provided, survey data, sales, discount/coupon information, possible purchase locations, articles, recipes, opinions, etc. about the pop can be provided, and/or additional information can be provided as well. Some or all of the information obtained by the image search can be stored with or instead of the point-of-view image in the life-log.

If the decision at block 140 is to save the point-of-view image, method 100 proceeds to block 142, where the point-of-view image is stored, and then method 100 proceeds to block 150.

If the decision at block 140 is not to save the point-of-view image, method 100 proceeds to block 150, where a decision is made to perform face/object identification on the point of view image using the techniques discussed above for block 140. If the face/object identification is to be performed on the point-of-view image, method 100 proceeds to block 152. However, if the face/object identification is to be performed on the point-of-view image, method 100 can terminate.

At block 152, objects, including faces, within the point-of-view image can be selected for identification. For example, using an image editor or similar tool, a region, or perhaps all, of the point-of-view image can be selected as a sub-image. The selected sub-image can be provided to a search engine configured to perform image searches. The search engine can search for data on one or more computers, perhaps connected by a network such as the internet. In some embodiments, the search engine can be configured to search the life-log; i.e., to search for faces or objects recorded in the life-log.

At block 154, the selected objects, perhaps including faces, can be identified. The identification can include identification based on the image search(es) performed at block 152, text-based searches, identification provided manually by the wearer, and/or by other techniques.

At block 160, a decision is made to store the identification in the life-log using the techniques discussed above for block 140. If the identification is to be stored in the life-log, method 100 proceeds to block 162. However, if the identification is not to be stored in the life-log, method 100 can terminate.

At block 162, the identification can be stored in the life-log. If the point-of-view image was stored in the life-log at block 142, then the identification can be stored and perhaps associated with the point-of-view image. For example, the life-log can be configured as one or more entries. Each entry in the life-log can include an image portion to store image(s), a text portion to store associated text, and an additional data portion to store additional data. Entries in the life-log can include other portions as well, such as, but not limited to, an audio portion to store audio, video portion to store video, and a binary portion to store binary data such as compressed and/or encrypted data and/or compiled software.

After carrying out the procedures of block 162, method 100 can terminate. In other embodiments, upon completion of the procedures of block 162, method 100 can restart at block 110, perhaps until receiving a command and/or other signal to terminate.

Figure 2:
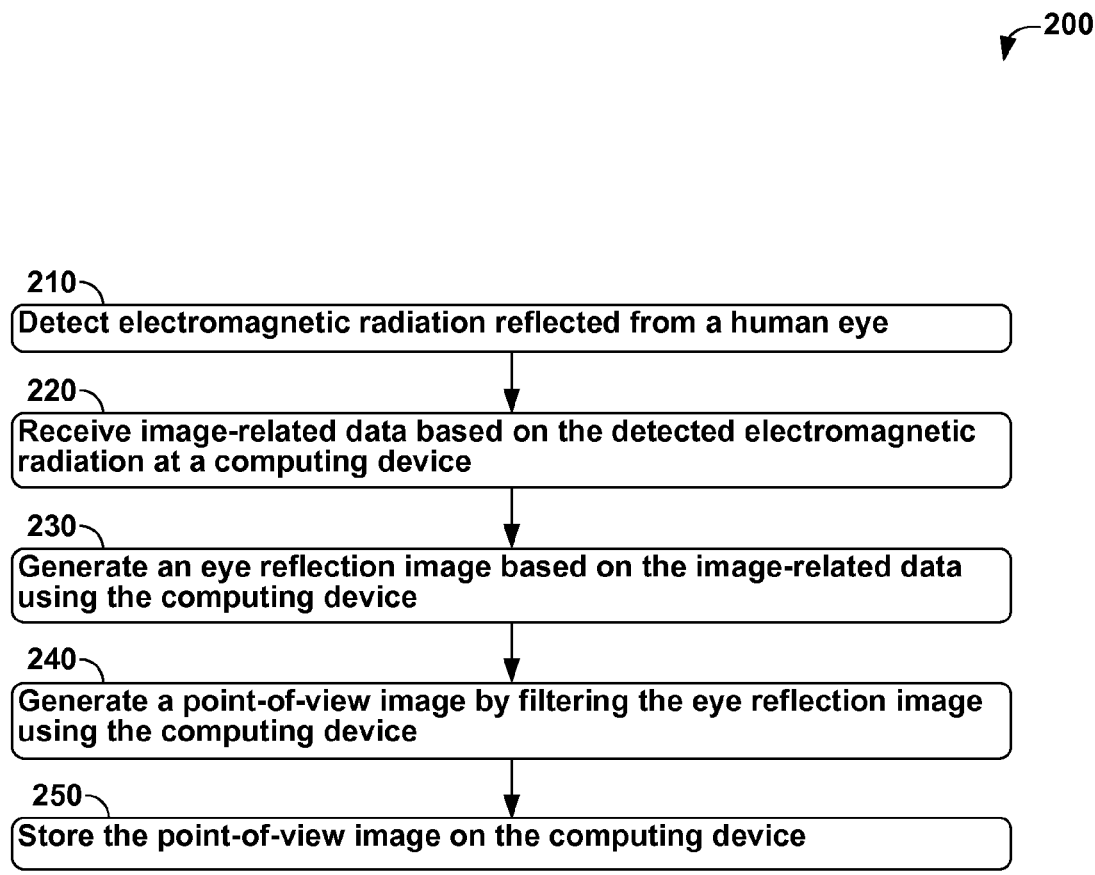
FIG. 2 is a flow chart illustrating another method, according to an example embodiment.

FIG. 2 is a flow chart illustrating method 200, according to an example embodiment. Method 200 begins at block 210, where electromagnetic radiation reflected from a human eye is detected. The electromagnetic data can be detected by a camera or other sensor configured to detect electromagnetic radiation reflected from a human eye. The camera or other sensors can be configured to face toward the human eye.

At block 220, a computing device can receive image-related data based on the detected electromagnetic radiation.

At block 230, the computing device can generate an eye reflection image based on the image-related data. The eye reflection image can be generated using the techniques described above in the context of block 120 of method 100, as well as other techniques described herein.

At block 240, the computing device can generate a point-of-view image by filtering the eye reflection image. The point-of-view image can be generated using the techniques described above in the context of block 130 of method 100, as well as other techniques described herein.

At block 250, the computing device can store the point-of-view image. In particular embodiments, storing the point-of-view image can include: capturing a sound using a sensor associated with the computing device, analyzing the sound to determine a directive related to the point-of-view image using the computing device, and in response to the directive related to the point-of-view image comprising a directive to store the point-of-view image, storing the point-of-view image using the computing device.

In other embodiments, storing the point-of-view image can include: analyzing the point-of-view image to determine whether the point-of-view image comprises at least a sub-image of a face of a person. In response to determining that the point-of-view image comprises at least a sub-image of the face of the person, the face of the person can be identified and identification information related to the identified face of the person can be determined. The sub-image of the face of the person and the identification information can be stored. In particular embodiments, the identification information can include a name of the person.

In some embodiments, the stored point-of-view image can be transmitted by the computing device, perhaps to one or more other computing devices.

In other embodiments, the computing device can receive second image-related data. The second image-related data can be based on second electromagnetic radiation reflected from the human eye. The computing device can generate a second eye reflection image based on the second image-related data. The computing device can generate the second point-of-view image by filtering the second eye reflection image. Then, the computing device can determine whether the point-of-view image and the second point-of-view image are similar. In particular embodiments, if the point-of-view image and the second point-of-view image are not similar, then the computing device can store the second point-of-view image.

II. Generating Point-of-View Images

Figure 3A:
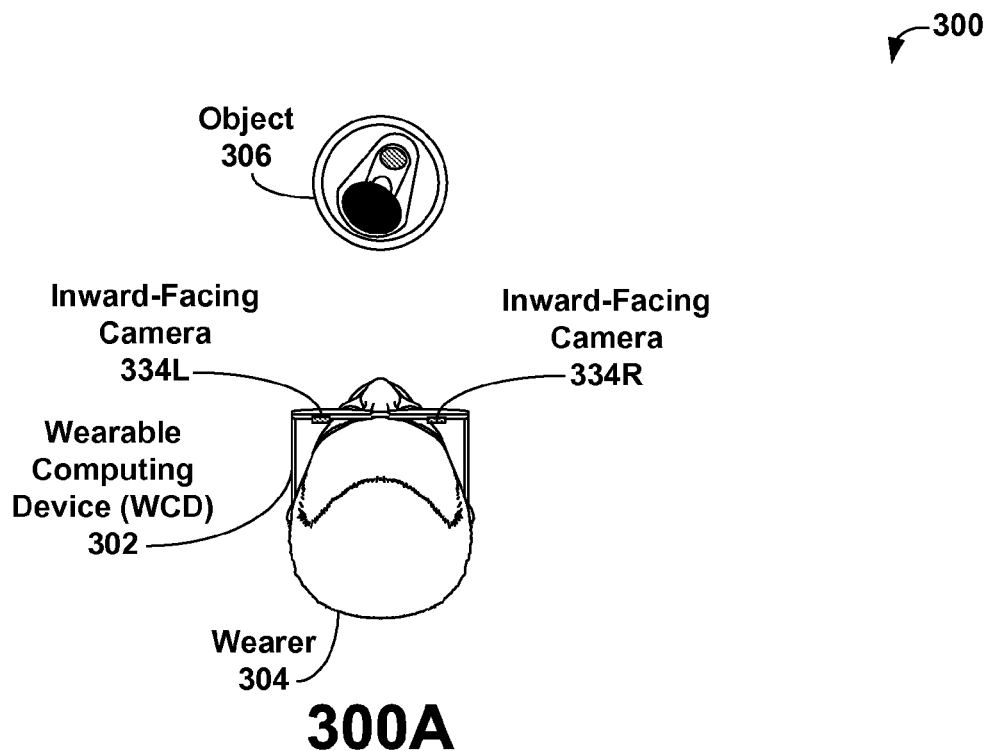
FIGS. 3A and 3B illustrate a scenario for generating a point-of-view image from electromagnetic radiation reflected from an eye, according to an example embodiment.
Figure 3A:
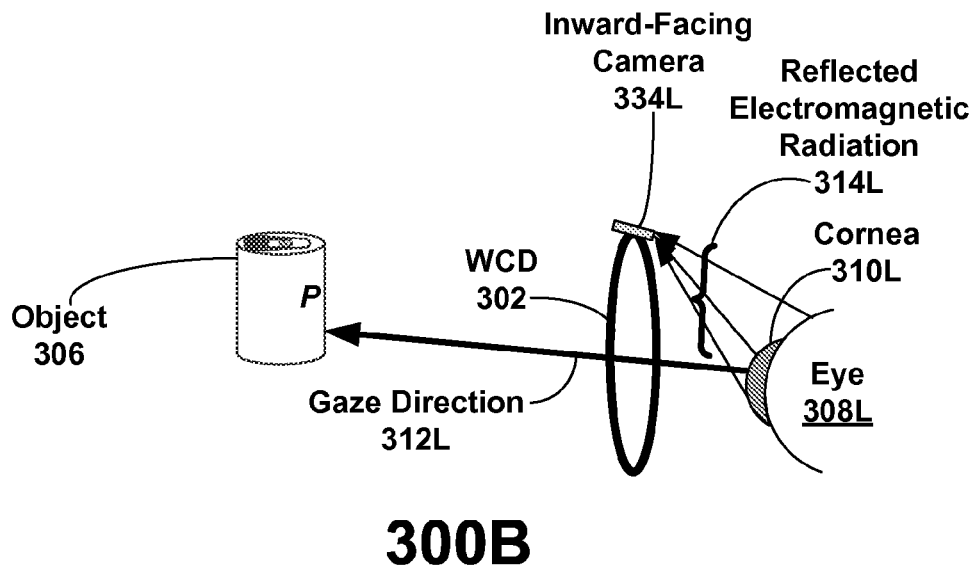
Figure 3B:
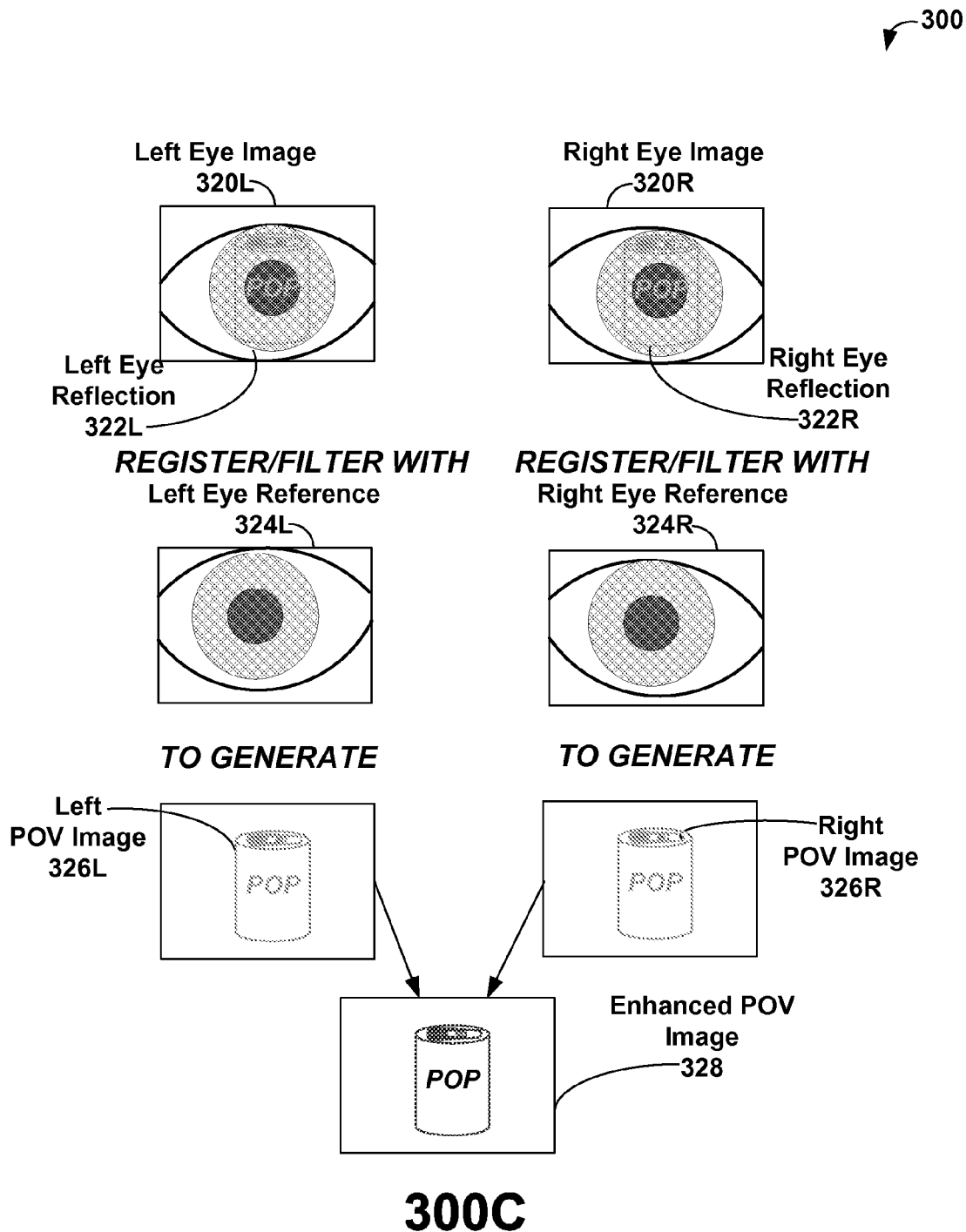

FIGS. 3A and 3B illustrate scenario 300 for generating a point-of-view image from electromagnetic radiation reflected from an eye, according to an example embodiment. At 300A and 300B of FIG. 3A, a wearer 304 with a left eye 308L is viewing an object 306 while wearing wearable computing device 302. Wearable computing device 302 includes two inward-facing cameras 334L and 334R, with inward-facing camera 334L configured to capture electromagnetic radiation; e.g., light, from left eye 308L of wearer 304 and inward-facing camera 334R configured to capture electromagnetic radiation from right eye 308R (not depicted in FIG. 3A) of wearer 304.

An overhead view of wearer of wearer 304 looking at object 306 is shown at 300A of FIG. 3B. A cut-away view of left eye 308L of wearer 304 looking at object 306, as indicated in FIG. 3A using gaze direction 312L shown as an arrow from eye 308L to object 306, is shown at 300B of FIG. 3B. Left eye 308L includes a cornea 310L that protects an iris, lens, and pupil of eye 308L (iris, lens, and pupil not shown in FIG. 3A). Electromagnetic radiation 314L, such as ambient light in an environment of wearer 304, can be reflected from eye 308L including cornea 310L. Part or all of electromagnetic radiation 314L can be captured by inward-facing camera 334L to generate a combined image of eye 308L, cornea 310L, and object 306.

FIG. 3B shows left eye image 320L as the combined image of eye 308L, cornea 310L, and object 306. During scenario 300, inward-facing camera 334R is configured to capture electromagnetic radiation reflected from right eye 308R to generate right eye image 320R, as discussed above for inward-facing camera 334L and left eye 308L. In scenario 300, wearable computing device 302 uses inward-facing cameras 334L, 334R to respectively generate images 320L, 320R substantially simultaneously. In other scenarios, wearable computing device 302 can be configured with only one inward-facing camera (e.g., either camera 334L or 334R); while in still other scenarios wearable computing device 302 can be configured with more than two inward-facing cameras. In even other scenarios, images 320L, 320R are captured one-at-a-time rather than simultaneously, e.g., a left image, such as image 320L, is first captured, and then a right image, such as image 320R, is captured only after the left image is captured (or vice versa).

FIG. 3B shows left eye reference 324L and right eye reference 324R. Each reference 324L, 324R can be an image of the respective eye without a discernible reflection of an object, such as an image of the respective eye looking at a matte white wall or a very distant object. As such, left and right eye references 324L, 324R are respective images of left and right eyes 308L, 308R without any reflected object images.

As shown in FIG. 3B, left eye image 320L includes left eye reflection 322L and right eye image 320R includes right eye reflection 322R. Wearable computing device can register left eye image 320L with respect to left eye reference 324L; that is, the features of left eye 308L that are part of left eye image 320L can be found in left eye reference 324L, to determine a transformation to map left eye image 320L to left eye reference 324L. The transformation can be applied to left eye image 320L to align features in left eye image 320L and left eye reference 324L.

After transformation, a difference between aligned left eye image 320L and left eye reference 324L can be determined. By taking the difference, the common portions between aligned left eye image 320L and left eye reference 324L can be eliminated; in other words, taking this difference filters out a reflection of left eye 308L to leave reflection(s) of object 306. FIG. 3B shows left point-of-view (POV) image 326L as the difference between aligned left eye image 320L and left eye reference 324L. Similarly, FIG. 3B shows right point-of-view image 326R as the difference between aligned right eye image 320R and right eye reference 324R.

Once left point-of-view image 326L and right point-of-view image 326R have been generated, super-resolution and other techniques can be used to enhance image quality for enhanced point-of-view image 328. A super-resolution algorithm can generate enhanced point-of-view image 328 using information from overlapping image 326L, 326R. A difference image, as well as differences in position and rotation, between an input image of the overlapping images and the initial image is determined. The difference image can be mapped into a pixel space of the initial image after adjusting for the differences in position and rotation. Then, the processed image can be generated by combining the adjusted difference image and the initial image. To further refine enhanced point-of-view image 328, the super-resolution algorithm can utilize a previously-generated enhanced point-of-view image as the initial image to be combined with additional, and perhaps later-captured, left and/or right point-of-view images to generate new enhanced point-of-view image(s). Thus, the initial image is progressively refined by the super-resolution algorithm to generate a (final) enhanced point-of-view image 328.

Additionally or instead, other image-processing techniques, including stereo-based techniques, can be applied to left point-of-view image 326L and/or right point-of-view image 326R to generate enhance point-of-view image 328. In other embodiments not shown in FIG. 3B, point-of-view image 328 can be generated by designating either left point-of-view image 326L or right point-of-view image 326R as point-of-view image 328. In still other embodiments not shown in FIG. 3B, left point-of-view image 326L and right point-of-view image 326R can be combined to generate depth information and/or a three-dimensional (3D) image of object 306.

In embodiments not shown in the figures, additional image(s) can be taken from an outward-facing camera, perhaps attached to WCD 302, that is aimed generally forward; e.g., at object 306 and/or along a specific direction, such as gaze direction 312L. These additional images can be used to filter and/or enhance point-of-view images, such as left point-of-view image 326L and/or right point-of-view image 326R. For example, suppose an outward-facing camera OFC were attached to WCD 302 aimed to face in gaze direction 312L toward object 306. Images from OFC can be compared to left point-of-view image 326L to perform a consistency check; that is, determine whether left point-of-view image 326L includes imagery of objects generally visible from the left point-of-view, such as object 306. If the left point-of-view image 326L and images from OFC show the same or nearly the same objects, then left point-of-view image 326L can be filtered and/or enhanced by features from the images from OFC as part of generating enhanced point-of-view image 328. In contrast, if left point-of-view image 326L and images from OFC do not show generally the same objects, the information from left point-of-view image 326L or the information from the images from OFC can be discarded as inconsistent. Also, images from OFC can be used to compare, filter, enhance and/or perform consistency checks on right point-of-view image 326R and/or generate enhanced point-of-view image 328 for right point-of-view image 326R. In particular embodiments, an outward-facing camera OFC2 can be attached to WCD 302 aimed generally forward; e.g., at object 306 and/or along a specific direction, such as a typical gaze direction of a right eye of wearer 304, to capture similar additional images from the right eye's point-of-view as discussed above with respect to camera OFC and the left eye. In even more particular embodiments, both outward-facing cameras OFC and OFC2 can be utilized as discussed herein.

III. LIFE-LOGS

Figure 4A:
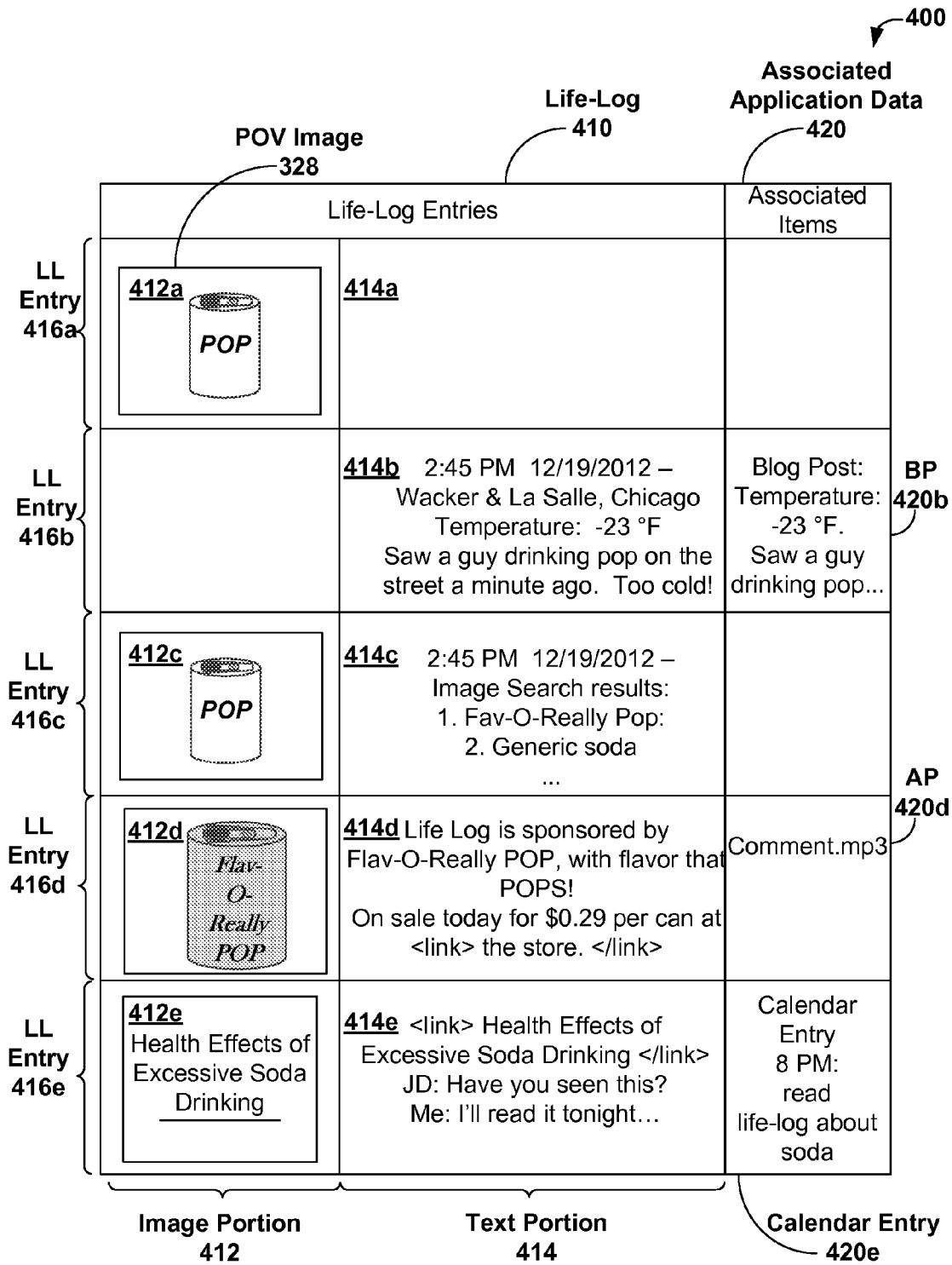
FIG. 4A illustrates a scenario for generating entries in a life-log based on capturing a point-of-view image, according to an example embodiment.

FIG. 4A illustrates scenario 400 for generating life-log (LL) entries 416a-416e in life-log 410 based on capturing point-of-view image 328, according to an example embodiment.

Life-log 410 can be separated into one or more "entries" or records of an occurrence stored in life-log 410. As shown in FIG. 4A, scenario 400 shows five example entries 416a-416e generated after capturing point-of-view image 328 as first shown in FIG. 3B. In scenario 400, the occurrence recorded by each entry 416a-416e is the capture of point-of-view image 328. In other scenarios not shown in FIG. 4A, the occurrence can be a specific request to add an entry to life-log 410, a capture of information other than an image, such as audio, video, alpha numeric, binary, and/or other types of information, or a different occurrence.

Life-log entries can be divided into portions, where each portion can include one or more instances of a type of data. For example, FIG. 4A shows life-log entries with an image portion 412 for storing one or more images per entry and text portion 414 for storing one or more instances of text per entry. Other types of portions, such as but not limited to audio, video, and/or binary portions, can be used along with and/or instead of life-log portions 412 and 414 shown in FIG. 4A.

Data for other applications than a life-log can be associated with life-log entries as well. FIG. 4A shows associated application data 420 with associated items for various life-log entries. The associated applications can include, but are not limited to, blog software, audio and/or video replay software, e-mail/communications software, calendar software, contact management software, web browsing software, drawing/drafting software, spreadsheet software, text editors, image editors, audio editors, and game software.

Scenario 400 begins by creating life-log entry 416a with image portion 412a and text portion 414a. As shown in FIG. 4A, a copy of point-of-view image 328 can be stored in an image portion 412a of life-log entry 416a alone; e.g., without any text in text portion 414a.

While life-log entry 416b is generated in response to capturing point-of-view image 328, FIG. 4A shows that no images are stored as part of life-log entry. That is, even if image capture is a trigger to generate a life-log entry, the captured image is not required to be stored as part of the generated life-log entry. In other scenarios not shown in FIG. 4A, capture of other types of data than image data, such as audio or video data, can lead to generation of a life-log entry that may or may not store the captured data.

Life-log entry 416b includes a text portion 414b indicating a time of "2:45 PM" on "12/19/2012", a location of "Wacker & LaSalle, Chicago", a temperature of "−23° F.", and text of "Saw a guy drinking pop on the street a minute ago. Too cold!" Life-log entry 416b also includes an associated blog post (BP) 420b with at least part of the text shown in text portion 414b.

Life-log entry 416c includes a copy of point-of-view image 328 as image portion 412c. In scenario 400, a visual search was conducted using the image stored in image portion 412c and the search results were returned in text portion 414c. In scenarios not shown in FIG. 4A, the search results may include other types of data rather than text, such as images, or a combination of different types of data; e.g., images and text. Life-log 410 can store all data of different types in a text portion, in another portion such as an image portion, in a designated multiple-data-type portion, or using some other strategy.

Capturing a pop can image can trigger retrieval of related information and/or advertising data. In response to capturing point-of-view image 328, life-log entry 412d can be generated to provide advertising and related information about a brand of pop related to the point-of-view image 328. In scenario 400, wearer 304 has agreed to receive advertising information, such as shown in life-log entry 416d, in exchange for using software to generate and manage life-log 410. Life-log entry 416d can include an image 412d of a can of Flav-O-Really POP as shown in FIG. 4A, information/advertising about Flav-O-Really POP in text portion 414d that reminds wearer 304 that "Life Log is sponsored by Flav-O-Really POP", links related to one or more stores selling Flav-O-Really POP, and other information. Comments on the advertisement can be stored in life-log 420. In scenario 400, these comments are stored as audio comments in a "Comment.mp3" file in audio portion (AP) 420d.

In a scenario not shown in FIG. 4A, life-log entry 416d can instead include information from the image search conducted as part of completing life-log entry 416c. For example, life-log entry 416d can include information retrieved after selecting the "Flav-O-Really Pop" entry in image search results stored in text portion 414c. The search results can include an image of Flav-O-Really POP 412d as shown in FIG. 4A, information/advertising about Flav-O-Really POP in text portion 414d, links related to one or more stores selling Flav-O-Really POP, and other information. Comments on the search results can be provided and stored in life-log 420, perhaps as audio comments in a "Comment.mp3" file as audio portion (AP) 420d.

Scenario 400 continues with generation of life-log entry 416e that includes a link to a conversation recalled by wearer 304 while looking at object 306. The conversation, stored in text portion 414e, includes a link to a paper entitled "Health Effects of Excessive Soda Drinking", a comment from "JD" that asks "Have you seen this?", and a reply comment from "Me" that says "I'll read it tonight." FIG. 4A shows that image portion 412e includes an image of a title page of the "Health Effects of Excessive Soda Drinking" paper, and a calendar entry for "8 PM" to "read life-log about soda."

Many other life-log entries can be generated, updated, and created as shown beyond those shown in FIG. 4A as part of scenario 400.

Figure 4B:
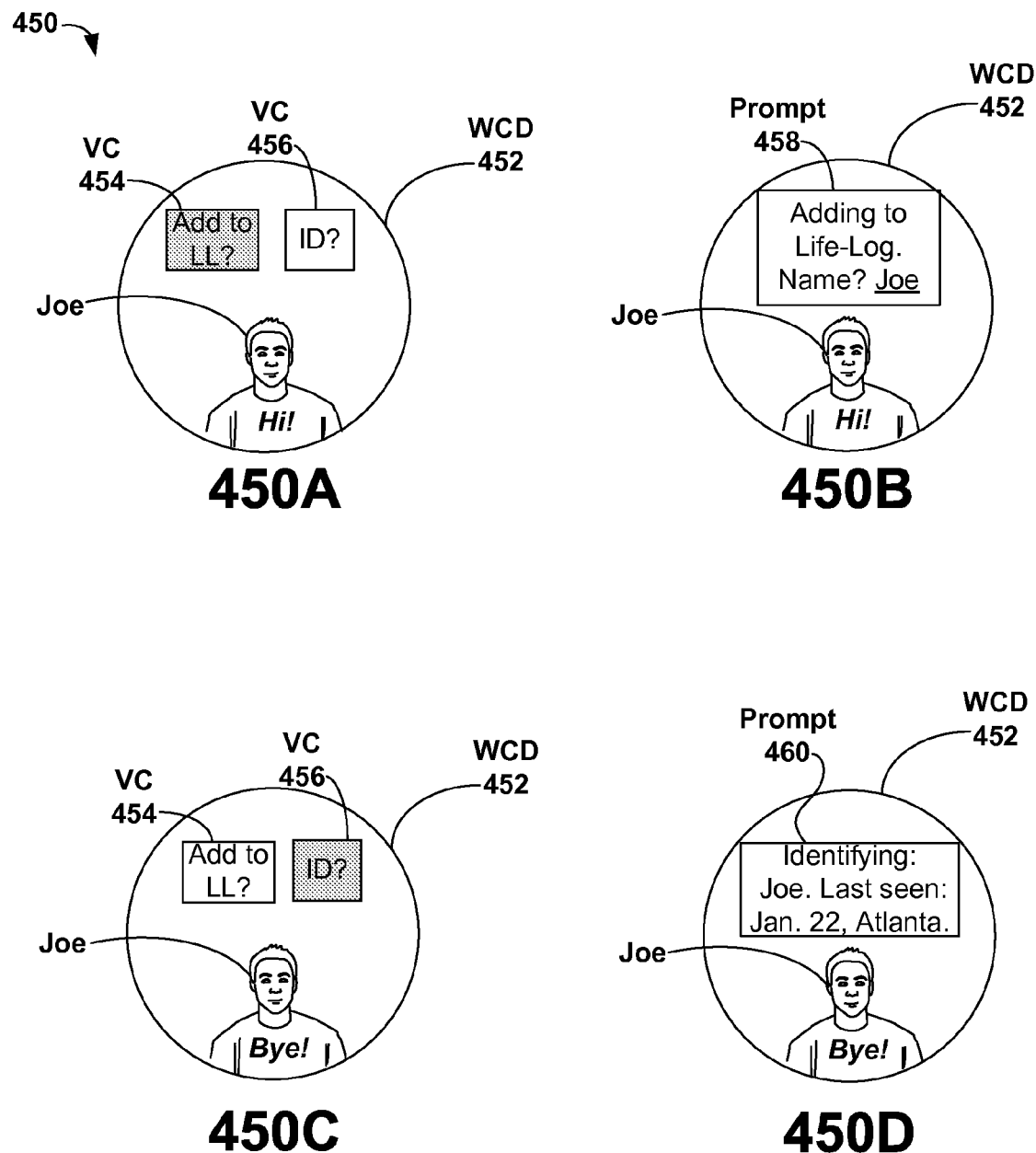
FIG. 4B illustrates a scenario 450 for using a life-log to identify a person, according to an example embodiment.

FIG. 4B illustrates a scenario 450 for using a life-log to identify a person, according to an example embodiment. At 450A of scenario 450, a wearer wearing wearable computing device (WCD) 452 meets a person "Joe." In scenario 450, Joe has consented to being photographed by a wearer of wearable computing device 452, and to have at least his name stored and associated with his photograph on wearable computing device.

During scenario 450, wearable computing device 452 captures a point-of-view image of Joe using the techniques discussed above. After capturing the point-of-view image of Joe, wearable computing device 452 can generate two display items corresponding to "visual commands" (VC): display item 454 to add a life-log (LL) entry and display item 456 to identify object(s) and/or person(s) in the captured point-of-view image.

Scenario 450 continues at 450A with the selection of display item 454, shown in grey to indicate selection. In response, wearable computing device 452 creates a life-log entry. At 450B of FIG. 4B, wearable computing device 452 is shown having displayed prompt 458 indicating that the point-of-view image is being added to the life-log. Prompt 458 also requests entry of the name of the person shown in the point-of-view image. Scenario 450 continues with the name "Joe" being provided.

Scenario 450 continues at 450C, where at a later date, the wearer of wearable computing device 452 meets Joe again. After capturing a point-of-view image of Joe, wearable computing device 452 generates display item 454 to add the point-of-view image to the life-log and display item 456 to identify object(s) and/or person(s) in the captured point-of-view image. At 450C of scenario 450, display item 456 is selected as shown using grey in FIG. 4B.

In response to the identification visual command, wearable computing device 452 can start a visual search for a person or object in the point-of-view image captured at 450C. The visual search can be carried out by wearable computing device 452 searching data, such as part or all of the life-log, stored on or otherwise accessible by wearable computing device 442.

In some embodiments, the visual search can be carried out using one or more servers searching data, such as part or all of the life-log, stored remotely from wearable computing device 442. That is, in some embodiments, the life-log can be wholly stored on wearable computing device 452; in other embodiments, the life-log can be wholly stored on computing devices other than wearable computing device 452, such as one or more life-log servers, and in still other embodiments, the life-log can be stored both locally on wearable computing device 452 and remotely from wearable computing device 452; e.g., recently generated and/or accessed entries are stored on wearable computing device 452, while other entries are stored remotely from wearable computing device 452.

In response to the visual search, an identification of the person, Joe, in the point-of-view image captured at 450C can be made. At 450D of FIG. 4B, prompt 460 is generated by wearable computing device 452. Prompt 460 provides the identity of Joe as well as some statistics about meetings with Joe. As shown in FIG. 4B, prompt 460 informs the wearer of wearable computing device 452 that the wearer last saw Joe on "Jan. 22" in "Atlanta."

In some embodiments not shown in FIG. 4B, other information can be provided as well as and/or instead of the information shown in prompt 460. The other information can include, but is not limited to, one or more previously-captured images of a person or object, such as the image captured of Joe captured on Jan. 22 in Atlanta, a count and/or summary of life-log entries pertaining to an identified person or object; e.g., "There are five life-log entries about Joe: four entries about Project Alpha, and one entry currently being generated", contact information such as phone number(s), e-mail addresses, social-networking identifiers, paper mail addresses, and/or other information related to the identified person or object, and/or other information. Many other scenarios are possible as well.

IV. Example Systems and Devices

Systems and devices in which example embodiments may be implemented will now be described in greater detail. In general, an example system may be implemented in or may take the form of a wearable computer. However, an example system may also be implemented in or take the form of other devices, such as a mobile phone, among others. Further, an example system may take the form of non-transitory computer readable medium, which has program instructions stored thereon that are executable by at a processor to provide the functionality described herein. An example, system may also take the form of a device such as a wearable computer or mobile phone, or a subsystem of such a device, which includes such a non-transitory computer readable medium having such program instructions stored thereon.

Figure 5A:
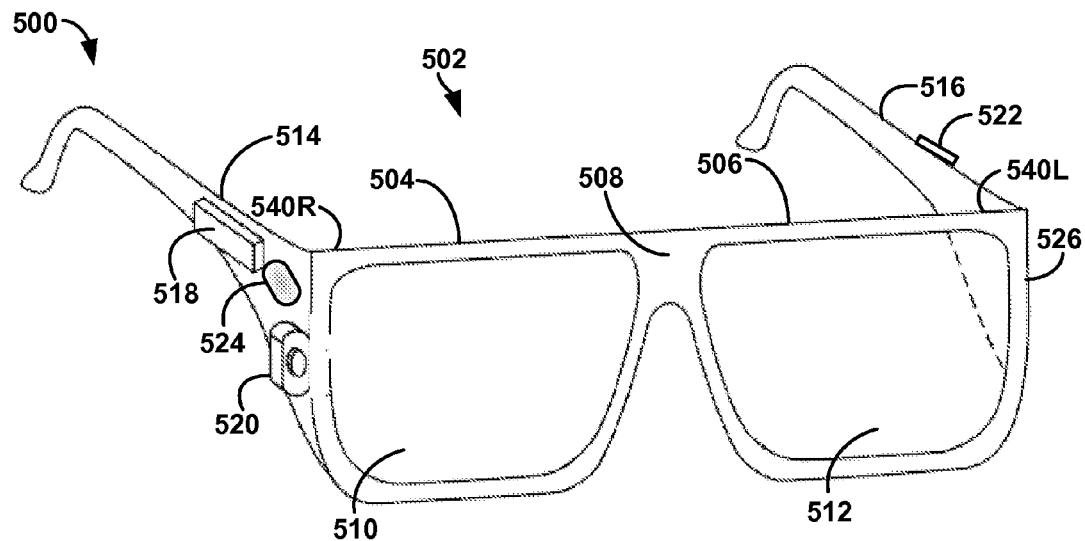
FIGS. 5A and 5B illustrate a wearable computing device (WCD), according to an example embodiment.
Figure 5B:
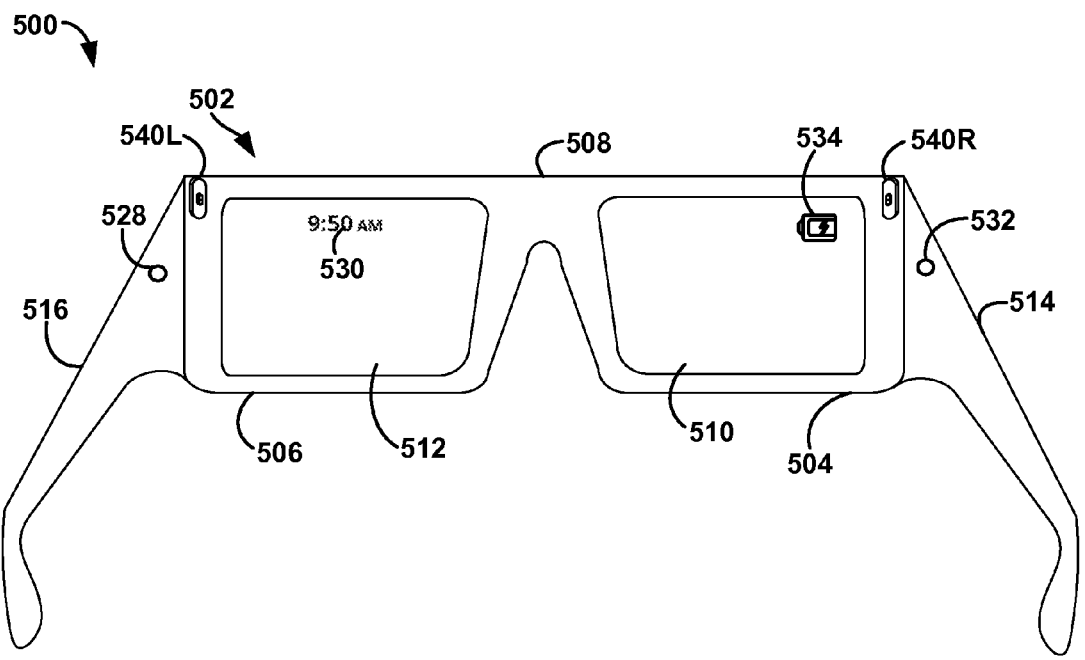

FIGS. 5A and 5B illustrate a wearable computing device 500, according to an example embodiment. In FIG. 5A, the wearable computing device 500 takes the form of a head-mountable device (HMD) 502 (which may also be referred to as a head-mountable display). It should be understood, however, that example systems and devices may take the form of or be implemented within or in association with other types of devices, without departing from the scope of the invention.

As illustrated in FIG. 5A, the head-mountable device 502 comprises frame elements including lens-frames 504 and 506 and a center frame support 508, lens elements 510 and 512, and extending side-arms 514 and 516. The center frame support 508 and the extending side-arms 514 and 516 are configured to secure the head-mountable device 502 to a wearer's face via a wearer's nose and ears, respectively.

Each of the frame elements 504, 506, and 508 and the extending side-arms 514 and 516 may be formed of a solid structure of plastic or metal, or may be formed of a hollow structure of similar material so as to allow wiring and component interconnects to be internally routed through the head-mountable device 502. Other materials may possibly be used as well.

One or both of lens elements 510 and 512 may be formed of any material that can suitably display a projected image or graphic. One or both of lens elements 510 and 512 may also be sufficiently transparent to allow a wearer to see through the lens element. Combining these two features of lens elements 510, 512 can facilitate an augmented reality or heads-up display where the projected image or graphic is superimposed over a real-world view as perceived by the wearer through the lens elements.

The extending side-arms 514 and 516 each may be projections that extend away from the frame elements 504 and 506, respectively, and are positioned behind a wearer's ears to secure the head-mountable device 502. The extending side-arms 514 and 516 may further secure the head-mountable device 502 to the wearer by extending around a rear portion of the wearer's head. Additionally or alternatively, for example, head-mountable device 502 may connect to or be affixed within a head-mounted helmet structure. Other possibilities exist as well.

Head-mountable device 502 may also include an on-board computing device 518, video cameras 520, 540L, 540R, a sensor 522, and finger-operable touchpads 524, 526. The on-board computing device 518 is shown on the extending side-arm 514 of the head-mountable device 502; however, the on-board computing device 518 may be positioned on other parts of the head-mountable device 502 or may be remote from head-mountable device 502; e.g., the on-board computing device 518 could be wired to or wirelessly-connected to the head-mounted device 102.

The on-board computing device 518 may include a processor and memory, for example. The on-board computing device 518 may be configured to receive and analyze data from video cameras 520, 540L, 540R, sensor 522, and the finger-operable touchpads 524, 526 (and possibly from other sensory devices, user interfaces, or both) and to generate images for output from the lens elements 510 and 512 and/or other devices.

The sensor 522 is shown mounted on the extending side-arm 516 of the head-mountable device 502; however, the sensor 522 may be provided on other parts of the head-mountable device 502. The sensor 522 may include one or more of a gyroscope or an accelerometer, for example. Other sensing devices may be included within the sensor 522 or other sensing functions may be performed by the sensor 522.

In an example embodiment, sensors such as sensor 522 may be configured to detect head movement by a wearer of head-mountable device 502. For instance, a gyroscope and/or accelerometer may be arranged to detect head movements, and may be configured to output head-movement data. This head-movement data may then be used to carry out functions of an example method, such as methods 100 and/or 200, for instance.

The finger-operable touchpads 524, 526 are shown mounted on the extending side-arms 514, 516 of the head-mountable device 502. Each of finger-operable touchpads 524, 526 may be used by a wearer to input commands. The finger-operable touchpads 524, 526 may sense at least one of a position and a movement of a finger via capacitive sensing, resistance sensing, or a surface acoustic wave process, among other possibilities. The finger-operable touchpads 524, 526 may be capable of sensing finger movement in a direction parallel or planar to the pad surface, in a direction normal to the pad surface, or both, and may also be capable of sensing a level of pressure applied. The finger-operable touchpads 524, 526 may be formed of one or more translucent or transparent insulating layers and one or more translucent or transparent conducting layers. Edges of the finger-operable touchpads 524, 526 may be formed to have a raised, indented, or roughened surface, so as to provide tactile feedback to a wearer when the wearer's finger reaches the edge of the finger-operable touchpads 524, 526. Each of the finger-operable touchpads 524, 526 may be operated independently, and may provide a different function.

FIG. 5B illustrates an alternate view of the wearable computing device shown in FIG. 5A. As shown in FIG. 5B, the lens elements 510 and 512 may act as display elements. The head-mountable device 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and configured to project a display 534 onto an inside surface of the lens element 510.

Inward-facing cameras 540L, 540R can be configured to perform the tasks described above for inward-facing cameras. In particular, each of inward-facing cameras 540L, 540R can be used to capture electromagnetic radiation reflected from an eye of a wearer—the left eye for inward-facing camera 540L and the right eye for inward-facing camera 540R—and generate images (e.g., eye reflection images and/or point-of-view images) and/or image data from the captured reflected electromagnetic radiation. Inward-facing cameras 540L, 540R can be still and/or video cameras. While two inward-facing cameras are shown in FIG. 5B, only one inward-facing camera or more than two inward-facing cameras can be used in some embodiments.

The lens elements 510 and 512 may act as a combiner in a light projection system and may include a coating that reflects the light projected onto them from the projectors 528 and 532. In some embodiments, a special coating may not be used (e.g., when the projectors 528 and 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the wearer, or other optical elements capable of delivering an in focus near-to-eye image to the wearer. A corresponding display driver may be disposed within the frame elements 504 and 506 for driving such a matrix display. Alternatively or additionally, a laser or light-emitting diode (LED) source and scanning system could be used to draw a raster display directly onto the retina of one or more of the wearer's eyes. Other possibilities exist as well.

While FIGS. 5A and 5B show two touchpads and two display elements, it should be understood that many example methods and systems may be implemented in wearable computing devices with only one touchpad and/or with only one lens element having a display element. It is also possible that example methods and systems may be implemented in wearable computing devices with more than two touchpads.

The outward-facing video camera 520 is shown to be positioned on the extending side-arm 514 of the head-mountable device 502; however, the outward-facing video camera 520 may be provided on other parts of the head-mountable device 502. The outward-facing video camera 520 may be configured to capture images at various resolutions or at different frame rates. Many video cameras with a small form-factor, such as those used in cell phones or webcams, for example, may be incorporated into an example of wearable computing device 500.

Although FIG. 5A illustrates one outward-facing video camera 520, more outward-facing video cameras may be used than shown in FIG. 5A, and each outward-facing video camera may be configured to capture the same view, or to capture different views. For example, the outward-facing video camera 520 may be configured to capture at least a portion of the real-world view perceived by the wearer. This real-world-view image captured by the outward-facing video camera 520 may then be used to generate an augmented reality where computer generated images appear to interact with the real-world view perceived by the wearer.

Wearable computing device 500 can include one or more inward-facing cameras 540L, 540R. Each of cameras 540L, 540R can be configured to capture still images and/or video of the wearer's eye to generate eye reflection images and/or point-of-view images. One or more of inward-facing cameras 540L, 540R can be built into the frame of head-mountable device 502, built into lens elements 510 and 512 outside of a display area, or built into a display area of lens elements 510 and 512.

Wearable computing device 500 may use other types of sensors to detect a wearer's eye movements, in addition to or in the alternative to an inward-facing camera. For example, wearable computing device 500 could incorporate a proximity sensor or sensors, which may be used to measure distance using infrared reflectance. In one such embodiment, lens element 510 and/or 512 could include a number of LEDs which are each co-located with an infrared receiver, to detect when a wearer looks at a particular LED. As such, eye movements between LED locations may be detected. Other examples are also possible.

Figure 6:
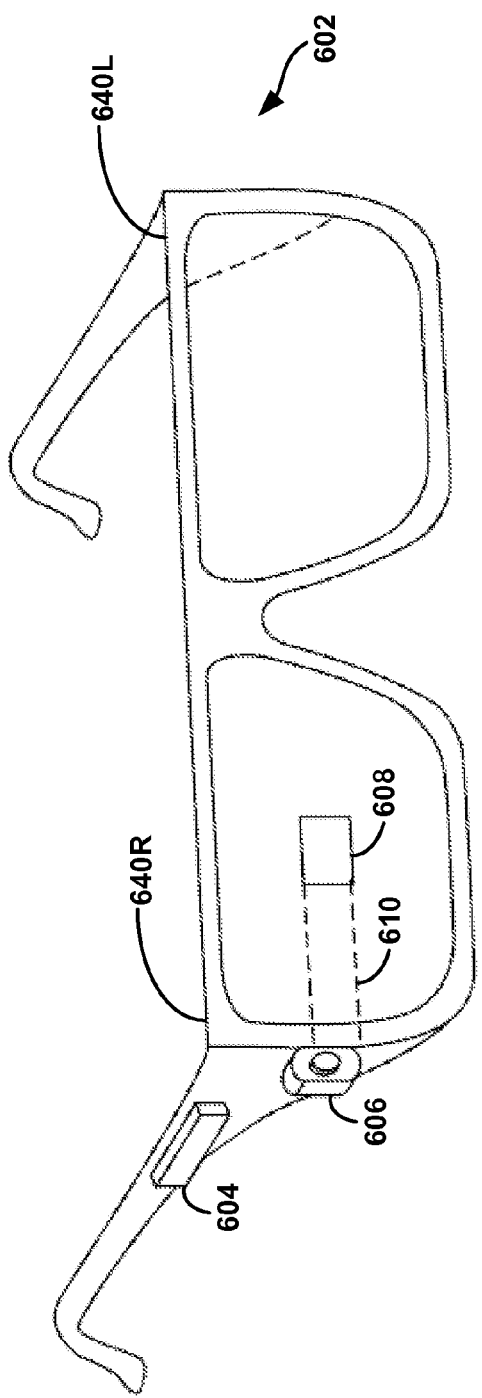
FIG. 6 illustrates another wearable computing device, according to an example embodiment.

FIG. 6 illustrates another wearable computing device, according to an example embodiment, which takes the form of head-mountable device 602. Head-mountable device 602 may include frame elements and side-arms, such as those described with respect to FIGS. 5A and 5B. Head-mountable device 602 may additionally include an on-board computing device 604, outward-facing video camera 606, and inward-facing video cameras 640L, 640R, such as described with respect to FIGS. 5A and 5B. Video camera 606 is shown mounted on a frame of head-mountable device 602. However, video camera 606 may be mounted at other positions as well.

As shown in FIG. 6, head-mountable device 602 may include display 608 which may be coupled to a wearable computing device. Display 608 may be formed on one of the lens elements of head-mountable device 602, such as a lens element described with respect to FIGS. 5A and 5B, and may be configured to overlay computer-generated graphics on the wearer's view of the physical world.

Display 608 is shown to be provided in a center of a lens of head-mountable device 602; however, the display 608 may be provided in other positions. The display 608 can be controlled using on-board computing device 604 coupled to display 608 via an optical waveguide 610.

Figure 7:
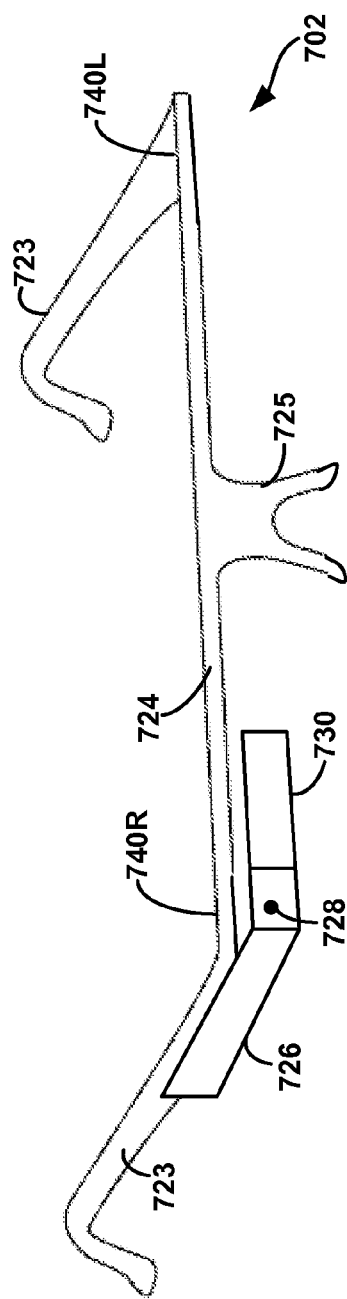
FIG. 7 illustrates yet another wearable computing device, according to an example embodiment.

FIG. 7 illustrates yet another wearable computing device, according to an example embodiment, which takes the form of head-mountable device 702. Head-mountable device 702 can include side-arms 723, a center frame support 724, and a bridge portion with nosepiece 725. In the example shown in FIG. 7, the center frame support 724 connects the side-arms 723. As shown in FIG. 7, head-mountable device 702 does not include lens-frames containing lens elements. Head-mountable device 702 may additionally include an on-board computing device 726, outward-facing video camera 729, and inward-facing video cameras 740L, 740R, such as described with respect to FIGS. 5A and 5B.

Head-mountable device 702 may include a single lens element 730 configured to be coupled to one of the side-arms 723 and/or center frame support 724. The lens element 730 may include a display such as the display described with reference to FIGS. 5A and 5B, and may be configured to overlay computer-generated graphics upon the wearer's view of the physical world. In one example, the single lens element 730 may be coupled to the inner side (i.e., the side exposed to a portion of a wearer's head when worn by the wearer) of the extending side-arm 723. The single lens element 730 may be positioned in front of or proximate to a wearer's eye when head-mountable device 702 is worn. For example, the single lens element 730 may be positioned below the center frame support 724, as shown in FIG. 7.

Figure 8:
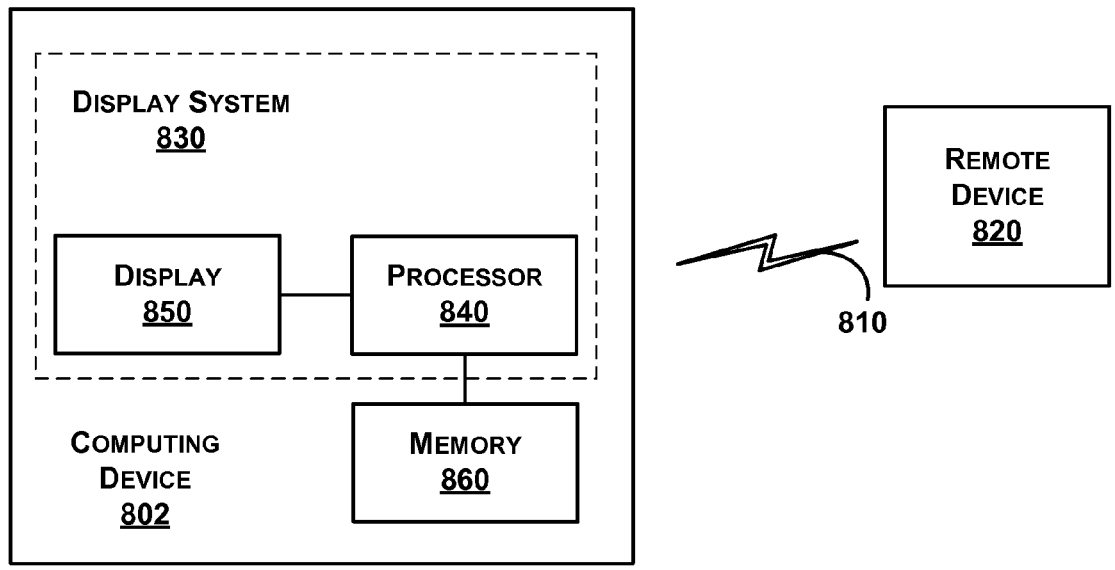
FIG. 8 illustrates an example schematic drawing of a computer network infrastructure in which an example embodiment may be implemented.

FIG. 8 illustrates a schematic drawing of computing device 802 according to an example embodiment. In system 800, computing device 802 communicates using a communication link 810 (e.g., a wired or wireless connection) to a remote device 820. Computing device 802 may be any type of device that can receive data and display information corresponding to or associated with the data. For example, computing device 802 may be a heads-up display system, such as the head-mounted devices 302, 452, 502, 602, and 702 described herein with reference to FIGS. 3A through 7.

Thus, computing device 802 may include a display system 830 comprising a processor 840 and a display 850. The display 850 may be, for example, an optical see-through display, an optical see-around display, or a video see-through display. The processor 840 may receive data from the remote device 820, and configure the data for display on the display 850. Processor 840 may be any type of processor, such as a micro-processor or a digital signal processor, for example.

Computing device 802 may further include on-board data storage, such as memory 860 coupled to processor 840. Memory 860 may store software that can be accessed and executed by the processor 840 to perform some or all of the functionality described herein, for example.

Remote device 820 may be any type of computing device or transmitter including a laptop computer, a mobile telephone, or tablet computing device, etc., that is configured to transmit and/or receive data to/from computing device 802. Remote device 820 and computing device 802 may contain hardware to establish, maintain, and tear down communication link 810, such as processors, transmitters, receivers, antennas, etc.

In FIG. 8, communication link 810 is illustrated as a wireless connection; however, communication link 810 can also or instead include wired connection(s). For example, communication link 810 may be a wired serial bus such as a universal serial bus or a parallel bus. A wired connection may be a proprietary connection as well. Communication link 810 may also be a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. Computing device 802 and/or remote device 820 may be accessible via the Internet and may include a computing cluster associated with a particular web service (e.g., social-networking, photo sharing, address book, etc.).

V. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
   receiving, by a computing device, eye-movement data corresponding to an eye, wherein the eye-movement data is generated by one or more sensors of a head-mountable device (HMD);
   generating, by the computing device, point-of-view image data based on electromagnetic radiation reflected from a surface of the eye, wherein the point-of-view image data corresponds to a field of view of the eye;
   determining that the point-of-view image data comprises a reflection, from the eye, of a real-world object;
   determining, by the computing device, that the eye-movement data corresponds to a stare in a direction of the real-world object;
   in response to determining that the eye-movement data corresponds to the stare in the direction of the real-world object, the computing device:
   (a) initiating an image-based search on the real-world object, wherein the image-based search provides search results based on a comparison of image data comprising the real-world object and reference image data; and
   (b) causing a graphic display to display search result information based on the image-based search; and
   while the search result information is displayed on the graphic display:
   receiving subsequent eye-movement data;
   determining whether or not the subsequent eye-movement data corresponds to a stare in the direction of the search result information;
   if the subsequent eye-movement data corresponds to a stare, then responsively storing the search result information to a life-log of a user-account associated with the computing device; and
   otherwise, if the subsequent eve-movement data does not correspond to a stare, then refraining from storing the search result information to the life-log.

2. The method of claim 1, wherein generating the point-of-view image based on electromagnetic radiation reflected from a surface of the eye comprises the computing device:
   generating an eye reflection image based on the electromagnetic radiation reflected from the surface of the eye, wherein the eye reflection image comprises an image of the surface of the eye with one or more reflections, from the eye, of one or more objects in the field of view of the eye, and wherein the one or more objects comprise the real-world object; and
   filtering the eye reflection image to generate the point-of-view image, wherein the filtering comprises determining a difference between the eye reflection image and a pre-determined reference image of an eye surface.

3. The method of claim 2, wherein the eye-movement data comprises the eye reflection image.

4. The method of claim 1, wherein the eye-movement data comprises data generated by one or more proximity sensors that are arranged on the HMD such that the one or more proximity sensors are directed towards an eye area of the eye when the HMD is worn.

5. The method of claim 1, wherein the image-based search request comprises the point-of-view image and an indication of a location of the real-world object within the point-of-view image.

6. The method of claim 1, further comprising, performing image processing on the point-of-view image data to generate image data of the real-world object, wherein the image-based search request comprises the generated image data of the real-world object.

7. The method of claim 1, wherein determining that the eye-movement data corresponds to the stare in the direction of the real-world object comprises:

detecting, based on the eye-movement data, that the eye does not move more than a threshold amount during a predetermined period of time; and determining that the real-world object remains in the point-of-view image data during the predetermined period of time.

8. The method of claim 1, wherein initiating the image-based search comprises transmitting an image-based search request for an image-based search on the real-world object, the method further comprising:

receiving search-result data corresponding to the image-based search request, wherein the displayed search-result information is based on the received search-result data.

9. A head-mountable device (HMD) comprising:

one or more sensors that are arranged on the HMD so as to generate eye-movement data corresponding to an eye;

at least one processor;

program instructions stored on a non-transitory computer-readable medium and executable by the at least on processor to:

generate point-of-view image data based on electromagnetic radiation reflected from a surface of the eye, wherein the point-of-view image data corresponds to a field of view of the eye;

determine that the point-of-view image data comprises a reflection, from the eye, of a real-world object;

determine that the eye-movement data corresponds to a stare in a direction of the real-world object;

in response to determining that the eye-movement data corresponds to the stare in the direction of the real-world object: (a) initiate an image-based search on the real-world object, wherein the image-based search provides search results based on a comparison of image data comprising the real-world object and reference image data; and (b) cause a graphic display to display search result information based on the image-based search; and while the search result information is displayed on the graphic display:

receive subsequent eye-movement data;

determine whether or not the subsequent eye-movement data corresponds to a stare in the direction of the search result information;

if the subsequent eye-movement data corresponds to a stare, then responsively store the search result information to a life-log of a user-account associated with the computing device; and otherwise, if the subsequent eye-movement data does not correspond to a stare, then refrain from storing the search result information to the life-log.

10. The HMD of claim 9, wherein the HMD further comprises at least one inward-facing image capture device arranged on the HMD to capture eye reflection image data when the HMD is worn, wherein the program instructions are further executable by the at least on processor to:

operate the at least one inward-facing image capture device to generate an eye reflection image that captures the electromagnetic radiation reflected from the surface of the eye, wherein the eye reflection image comprises an image of the surface of the eye with one or more reflections, from the eye, of one or more objects in the field of view of the eye, and wherein the one or more objects comprise the real-world object; and filter the eye reflection image to generate the point-of-view image, wherein the filtering comprises a determination of a difference between the eye reflection image and a pre-determined reference image of an eye surface.

11. The HMD of claim 10, wherein the one or more sensors comprise the inward-facing image capture device, and wherein the wherein the eye-movement data comprises the eye reflection image.

12. The HMD of claim 10, wherein the one or more sensors comprise one or more proximity sensors that are arranged on the HMD such that the one or more proximity sensors are directed towards an eye area of the eye when the HMD is worn.

13. The HIVID of claim 9, wherein the one or more sensors comprise one or more proximity sensors that are arranged on the HMD such that the one or more proximity sensors are directed towards an eye area of the eye when the HMD is worn.

14. The HIVID of claim 9, wherein, to determine that the eye-movement data corresponds to the stare in the direction of the real-world object, the program instructions are executable to:

determine, based on the eye-movement data, that the eye has not moved more than a threshold amount during a predetermined period of time; and determine that the real-world object remains in the point-of-view image data during the predetermined period of time.

15. A computer-implemented method comprising:

receiving, by a computing device, eye-movement data corresponding to an eye, wherein the eye-movement data is generated by one or more sensors of a head-mountable device (HMD);

generating, by the computing device, point-of-view image data based on electromagnetic radiation reflected from a surface of the eye, wherein the point-of-view image data corresponds to a field of view of the eye;

determining that the point-of-view image data comprises a reflection, from the eye, of a real-world object;

determining, by the computing device, that the eye-movement data corresponds to a stare in a direction of the real-world object;

in response to determining that the eye-movement data corresponds to the stare in the direction of the real-world object, the computing device:

(a) initiating an image-based search on the real-world object, wherein the image-based search provides search results based on a comparison of image data comprising the real-world object and reference image data; and (b) storing the search result information corresponding to the image-based search in a life-log; and while the search result information is displayed on the graphic display:

receiving subsequent eye-movement data;

determining whether or not the subsequent eye-movement data corresponds to a stare in the direction of the search result information;

if the subsequent eye-movement data corresponds to a stare, then responsively storing the search result information to a life-log of a user-account associated with the computing device; and otherwise, if the subsequent eve-movement data does not correspond to a stare, then refraining from storing the search result information to the life-log.

* * * * *